US006234408B1

(12) United States Patent
Stevens et al.

(10) Patent No.: US 6,234,408 B1
(45) Date of Patent: May 22, 2001

(54) MOBILE CEMENTIOUS FIREPROOFING AND SPECIALTY COATING APPARATUS

(76) Inventors: Timothy Stevens; Matthew Stevens; Roger E. Stevens, all of 661 Union Ave., Holtsville, NY (US) 11742

( * ) Notice: Subject to any disclaimer, the term of this patent is extended or adjusted under 35 U.S.C. 154(b) by 0 days.

(21) Appl. No.: 09/541,805

(22) Filed: Apr. 3, 2000

(51) Int. Cl.[7] ..................... A01G 25/09
(52) U.S. Cl. ..................... 239/172; 239/304
(58) Field of Search ..................... 239/142, 172, 239/302–304, 310, 61, 398, 407, 418, 419, 306; 222/626, 145.5, 145.6; 366/160.2, 160.3, 162.1, 11

(56) References Cited

U.S. PATENT DOCUMENTS

| | | | | |
|---|---|---|---|---|
| 160,033 | | 2/1875 | Roush . | |
| 401,306 | | 4/1889 | Schock et al. . | |
| 656,123 | | 8/1900 | Kempf . | |
| 925,652 | | 6/1909 | Rippy . | |
| 1,602,105 | | 10/1926 | Geer et al. . | |
| 2,603,462 | * | 7/1952 | Brown et al. | 239/172 |
| 2,880,976 | * | 4/1959 | True | 239/172 |
| 3,476,318 | | 11/1969 | Eckert . | |
| 3,831,849 | | 8/1974 | Studinger . | |
| 3,858,761 | | 1/1975 | O'Dell . | |
| 4,376,512 | | 3/1983 | Kistner . | |
| 4,542,040 | | 9/1985 | Nowak . | |
| 4,705,217 | | 11/1987 | Hartley et al. . | |
| 5,085,897 | | 2/1992 | Luckanuck . | |
| 5,320,870 | | 6/1994 | Sorathia et al. . | |
| 5,372,789 | * | 12/1994 | Lamberts et al. | 366/160.2 |
| 5,788,163 | | 8/1998 | Woten et al. . | |
| 5,853,802 | | 12/1998 | Boyer et al. . | |

* cited by examiner

*Primary Examiner*—Lisa Ann Douglas
(74) *Attorney, Agent, or Firm*—Collard & Roe, PC

(57) ABSTRACT

A mobile fireproofing and specialty coating apparatus comprising a trailer, a generator mounted on the trailer, and a fuel tank connected to the generator for powering the generator. There is a work platform mounted to the trailer to allow the operators to work directly on the unit. A mixer for mixing a dry product with water is mounted on the work platform and comprises a vat, a rotatable mixing tool and a motor for rotating the mixing tool. The motor is powered by the generator. A pump is connected to the generator and is mounted adjacent the mixer. A hose is connected to the pump and to a spray nozzle for spraying the product. There is a second mixer for mixing accelerator with water mounted on the work platform, and comprises a mixing tank, a rotatable mixing tool and a motor connected to the mixing tool and the generator. There is a second pump for pumping the accelerator, and a second hose connected to the second pump and to the nozzle to mix the accelerator with the product immediately prior to spraying. A tool box is mounted to the work platform and there is scaffolding mounted to the trailer, so that the mobile unit is completely self contained and allows the operators to complete a spraying job without any outside support, except for a water source.

11 Claims, 7 Drawing Sheets

MOBILE CEMENTIOUS FIREPROOFING AND SPECIALTY COATING APPARATUS

BACKGROUND OF THE INVENTION

1. Field of the Invention

This invention relates to a mobile apparatus for spraying fireproofing and specialty coatings onto buildings during construction. In particular, the invention relates to a mobile unit having all of the required parts for completing a spraying job, all mounted onto a trailer that also functions as a work platform during spraying.

2. The Prior Art

In the field of fireproofing, the product to be applied is shipped in solid granular form and then mixed with water and sprayed onto the beams of new construction. The product is often mixed with an accelerator immediately prior to the spraying, to aid in the hardening of the product after spraying.

Typically, the fireproofing company brings the spraying equipment to the job site, where the product is first mixed with water in a mixer, and then transferred to a separate pump for spraying. All of the components are brought separately to the job site and used there. This has the disadvantage of requiring the product, power supply, mixers and pump to be separately brought to and from the job site. It also requires a separate outside power supply for the motorized components. It would be desirable to create a mobile unit that includes all of the necessary components for completing a spraying job, so that the unit merely needs to be driven from site to site.

Mobile sprayers are known. For example, U.S. Pat. No. 3,858,761 to O'Dell discloses a mobile pressure spraying apparatus having fluid reservoir, a pump and a nozzle mounted onto a trailer for spraying fluid such as asphalt sealers. U.S. Pat. No. 1,602,105 to Geer et al. discloses another portable spraying device having two tanks for holding the material to be sprayed and an air compressor for spraying. U.S. Pat. No. 3,831,849 to Studinger discloses another mobile sprayer having a gasoline engine driving a high pressure pump and having tanks for holding the fluids to be sprayed.

Various other insulation spraying devices are shown in U.S. Pat. No. 4,542,040 to Nowak, U.S. Pat. No. 5,788,163 to Woten et al., U.S. Pat. No. 4,376,512 to Kistner, U.S. Pat. No. 3,476,318 to Eckert, U.S. Pat. No. 5,853,802 to Boyer et al. and U.S. Pat. No. 5,320,870 to Sorathia et al.

While all of these inventions provide for spraying insulation or other liquids, none of the references disclose a completely self-contained work platform having all of the materials and machinery necessary to complete an insulation spraying job.

SUMMARY OF THE INVENTION

It is therefore an object of the invention to provide a mobile cementious fireproofing and specialty coating apparatus that is portable.

It is another object of the invention to provide a mobile cementious fireproofing and specialty coating apparatus that contains all of the elements necessary to complete a spraying job in a single apparatus.

It is another object of the invention to provide a mobile cementious fireproofing and specialty coating apparatus that also serves as a work platform during spraying.

It is a further object of the invention to provide a mobile cementious fireproofing and specialty coating apparatus having a pump that can be remotely controlled from the nozzle.

It is yet a further object of the invention to provide an mobile cementious fireproofing and specialty coating apparatus that allows for the product to mix with an accelerator at the nozzle.

These and other objects of the invention are accomplished by a mobile cementious fireproofing and specialty coating apparatus comprising a trailer having wheels and adapted to be attached to a truck, a generator mounted on the trailer, and a fuel tank connected to the generator and mounted on the trailer, for powering the mixing and pumping apparatus. There is a work platform mounted to the trailer to allow the operators to work directly on the unit. A mixer for mixing dry product with water is mounted on the work platform. The mixer comprises a vat, a rotatable mixing tool within the vat, and a motor connected to the mixing tool for rotating the mixing tool. The motor is connected to and powered by the generator.

A pump is connected to the generator and is mounted on the trailer adjacent the mixer. A hose is connected to the pump and to a spray nozzle for spraying product from the pump onto the construction site.

There is a second mixer for mixing accelerator with water mounted on the work platform. The second mixer comprises a mixing tank, a rotatable mixing tool disposed within the mixing tank and a motor connected to the mixing tool and the generator. There is a second pump connected to the generator for pumping the accelerator, and a second hose connected at one end to the second pump and at another end to the nozzle to mix the accelerator with the product immediately prior to spraying.

There are controls connected to the pump for turning the pump off and on. A tool box is mounted to the work platform for housing tools and equipment for on-site repairs. There is also a compartment for holding scaffolding, and there is scaffolding mounted to the trailer, so that the mobile unit is completely self contained and allows the operators to complete a spraying job without any outside support, except for a water source. Alternatively, the apparatus could also work in conjunction with a tanker truck.

In a preferred embodiment, there is a remote switch located on the nozzle for turning the pump off and on from the nozzle. This way, the pump can be turned off immediately and prevent any machine or pump line problems.

The second mixer, which mixes the accelerator, has a bracket mounted around the top edge of the mixing tank and connected to the mixing tool. The bracket has three prongs extending out from a central core, each prong being attached to the top edge of the mixing tank via a clamp. The clamp has an inside plate and an outside plate connected by a screw. The top edge of the mixing tank is inserted between the two plates and the screw is tightened to firmly mount the clamp to the mixing tank.

The mixing vat, which holds the mixed product, is pivotally mounted to the work platform and has a top opening, so that the product is transported from the mixing vat to the pump by tipping the mixing vat until the product pours from the mixing vat into the pump.

There is preferably at least one storage unit mounted to the trailer for storing scaffolding parts.

The fuel tank holds 180 gallons of diesel fuel for powering the generator. The generator is preferably a John Deere 40 Kw generator. The pump preferably has at least 30 horsepower and the mixer motor preferably has 9 horsepower. The scaffolding and work platform are preferably made of custom fabricated galvanized carbon steel.

The hose is preferably between 20 and 2000 feet long and has a diameter of about 2 inches near the pump. The diameter progressively decreases toward the nozzle, so that the diameter near the nozzle is about 1 inch. The apparatus also has a compartment that stores 200–300 feet of 3 in. vertical aluminum pump line.

Typical products used with the mobile unit are MK6® manufactured by Grace Products, Spatterkote-3® and Cafco 300® manufactured by U.S. Mineral Products. All products manufactured by WR Grace, Isolotech, Pyrock, Carboline, U.S. Mineral and others could also be used. As an example, the product is mixed at a ratio of 24 gallons of water to 340 lb bags of product in the mixer. The product is mixed for approximately 90 seconds prior to pumping, and hardens within 5 minutes when mixed with accelerator. A suitable accelerator is Monokote® by Grace products, which is an aluminum sulfate hydrate. The accelerator is mixed with water at a ratio of 1 60 lb bag of accelerator to 10 gallons water. The accelerator is pumped into the nozzle so that it mixes with the product immediately prior to spraying. The sprayed product preferably has about 3% accelerator in it. Some products do not require accelerator.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Referring now in detail to the drawings and, in particular, FIGS. 1–4, there is shown the mobile cementious fireproofing and specialty coating apparatus 10 according to the invention. Apparatus 10 comprises a trailer 20, which can be hooked to a truck (not shown) for transport to the work site. A work platform 21 is mounted to trailer 20 and provides a surface on which the people spraying the product can work. Work platform 21 is set up so that when trailer 20 is backed up to a truck, platform 21 is about the same height as the floor of the truck. This way, supplies can be easily unloaded from the truck to the platform 21 by laying a board across the space between the platform 21 and the truck and sliding the supplies across to the work platform 21.

Figure 1:
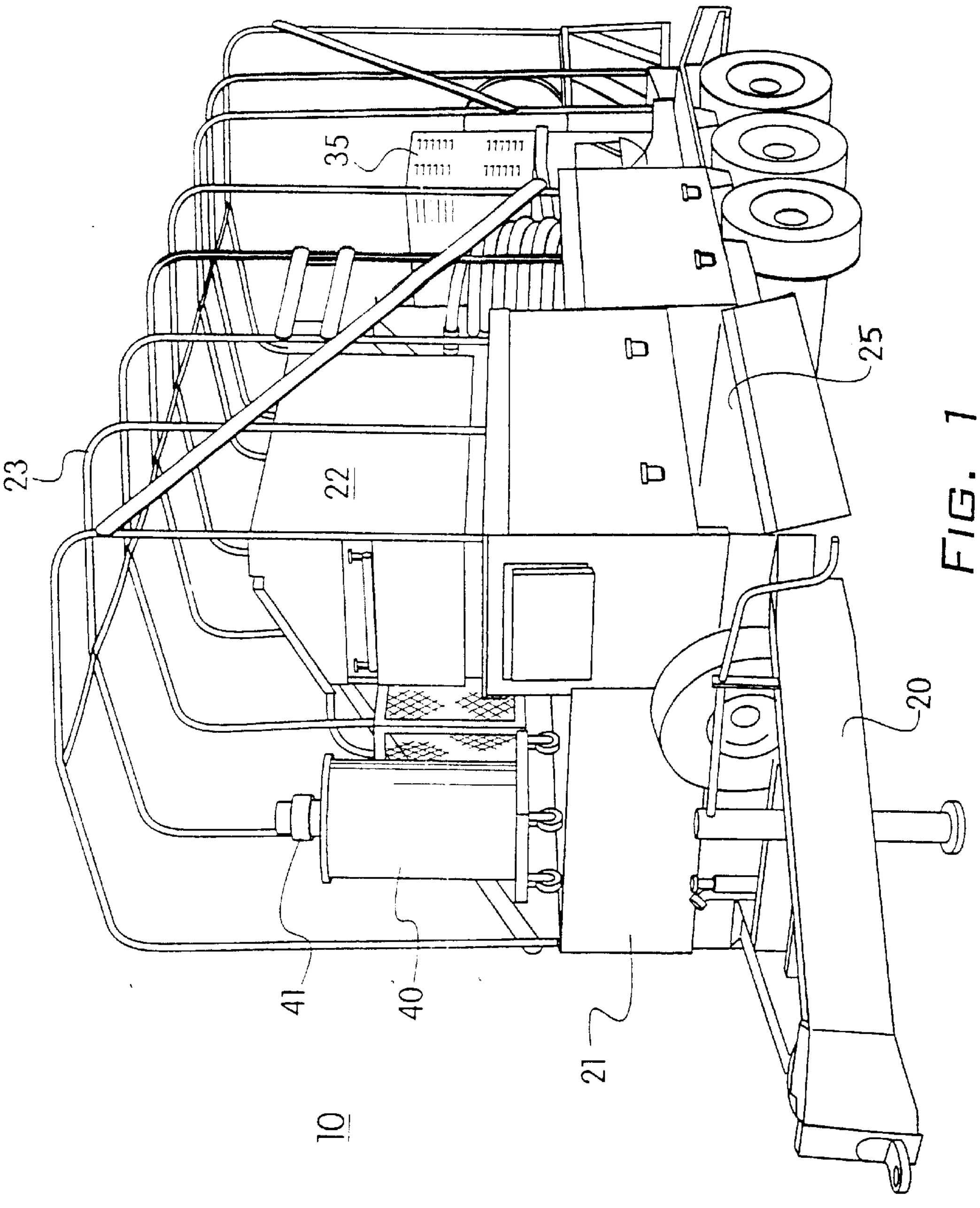
FIG. 1 shows a side perspective view of the apparatus according to the invention.
Figure 2:
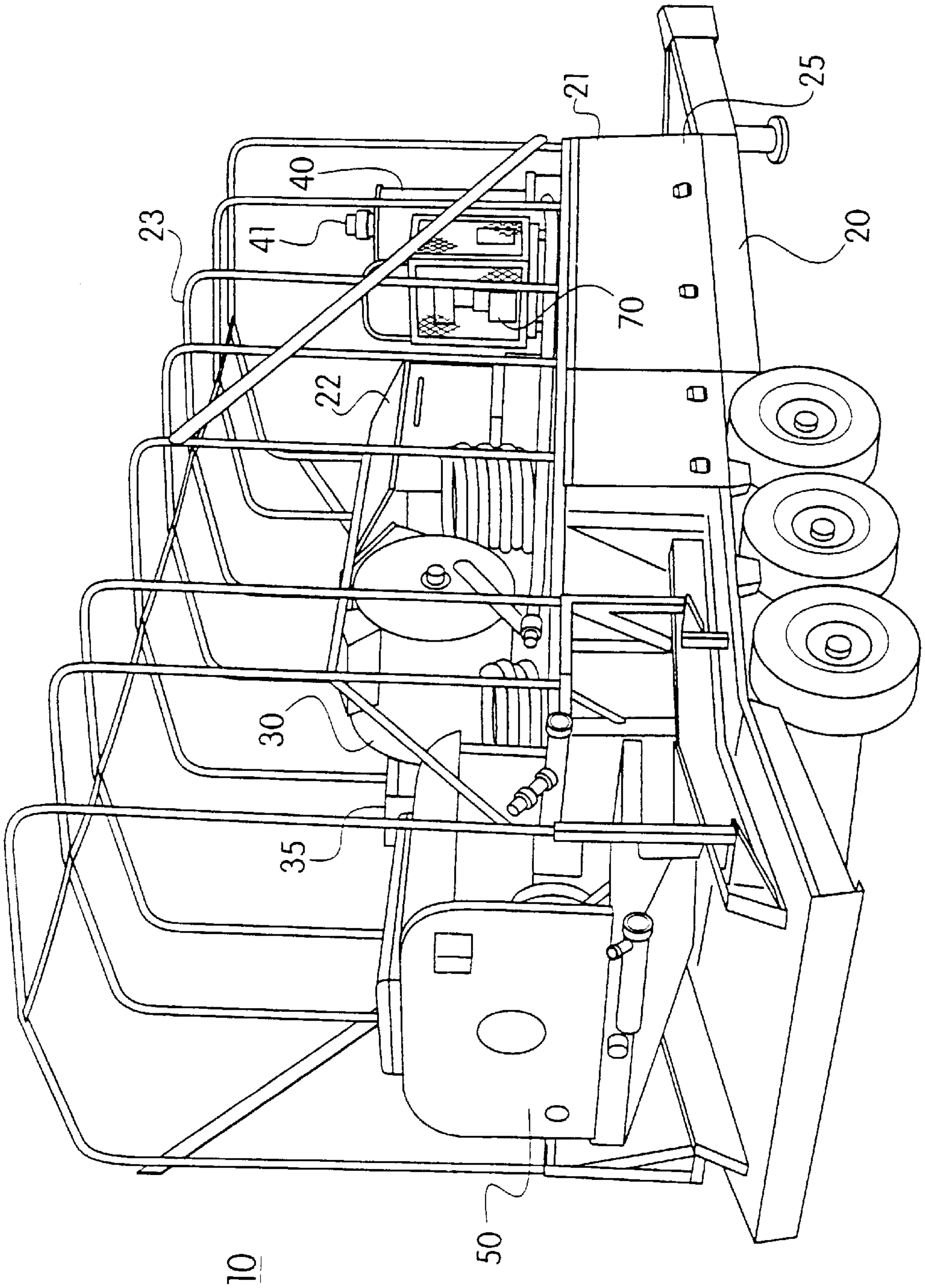
FIG. 2 shows an opposite side perspective view of the apparatus.
Figure 4:
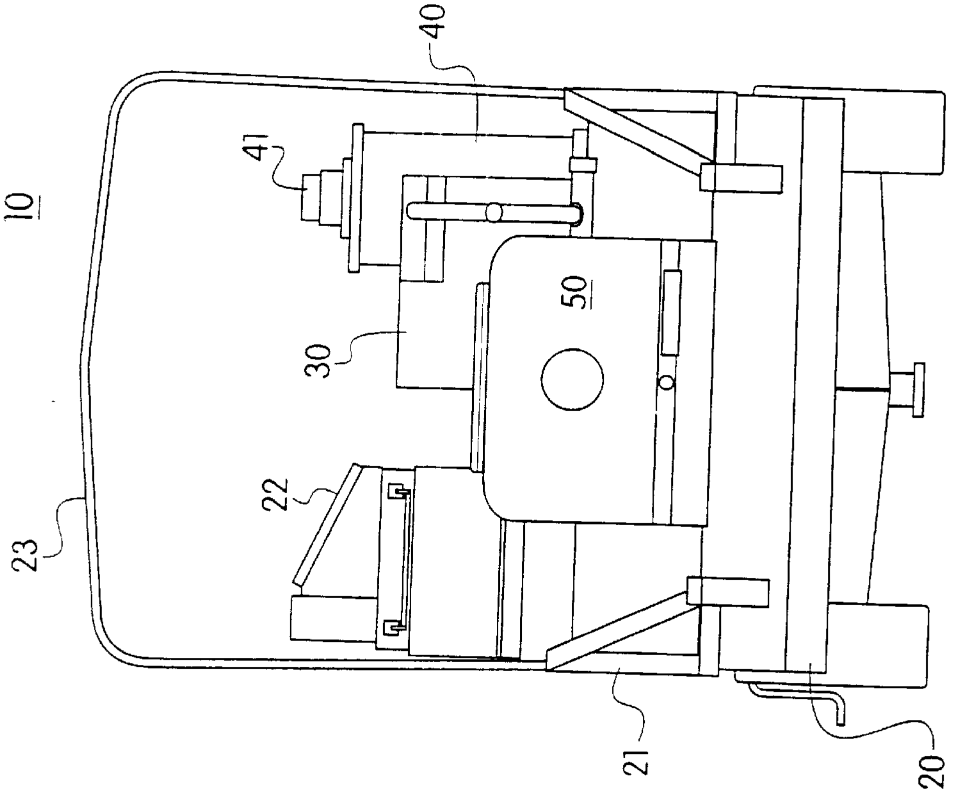
FIG. 4 shows a rear view of the apparatus.
Figure 3:
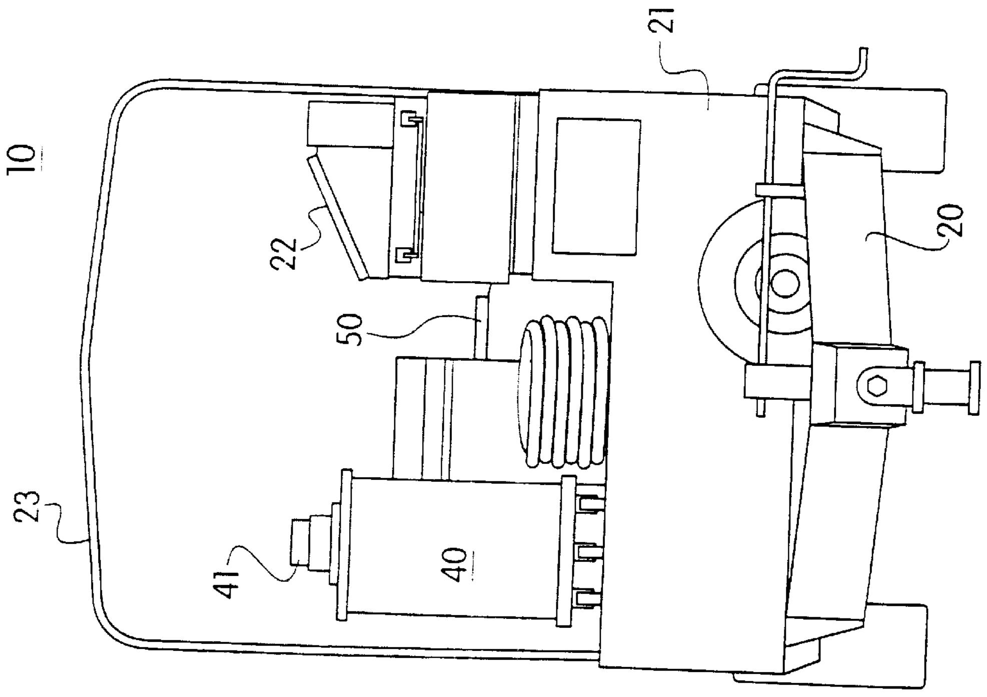
FIG. 3 shows a front view of the apparatus.
Figure 5:
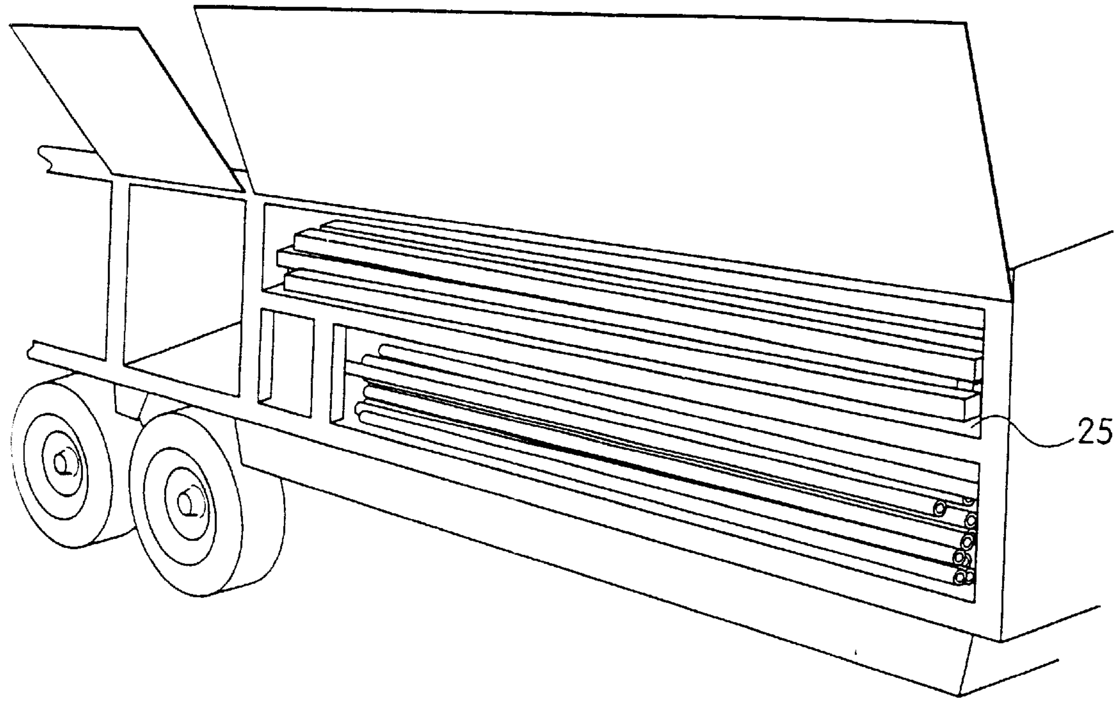
FIG. 5 shows a perspective view of the storage chamber of the apparatus according to the invention.

There is a tool box 22 mounted on work platform 21 to hold all of the necessary tools required for a spraying job. Scaffolding 23 is set up around platform 21 and can serve as a brace for a canopy to shield the components and the workers from precipitation and sun. As shown in detail in FIG. 5, there is a storage compartment 25 underneath work platform 21 to store extra scaffolding for use during the job.

Figure 6:
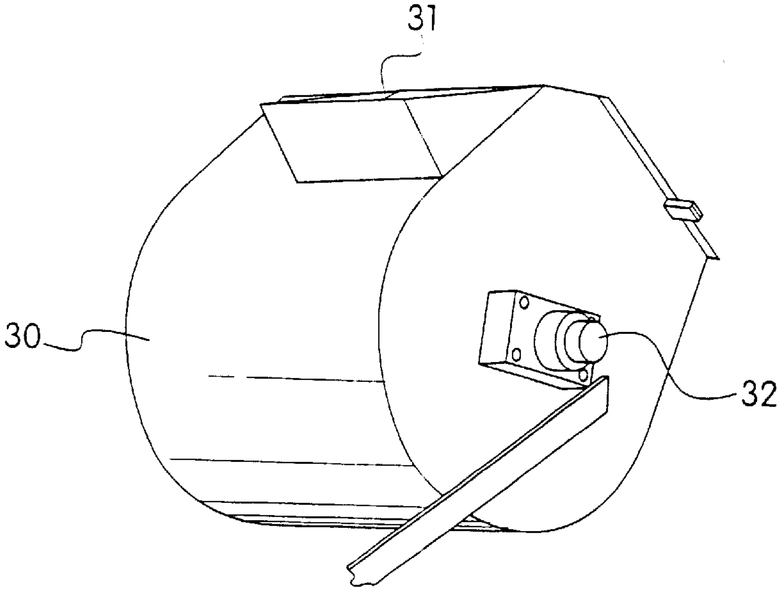
FIG. 6 shows a perspective view of the mixing vat for the product.

As shown in detail in FIG. 6, mixing vat 30 is pivotally mounted on work platform 21 for mixing dry product with water obtained from an outside water source. Mixing vat 30 has a rotatable mixer 32 which mixes the product and water within the vat. The product is generally mixed in a ratio to 120 lbs of product (3 40 lb bags) per 24 gallons of water. The water and product are poured in through opening 31 in mixing vat 30. Mixer 32 is a rotating screw that is driven by motor 35, which is mounted on work platform 21. Motor 35 is preferably a 9 horsepower motor. After the product is mixed, it is poured, by tipping vat 30 over, into a pump 50 for pumping it onto the substrate.

Figure 7:
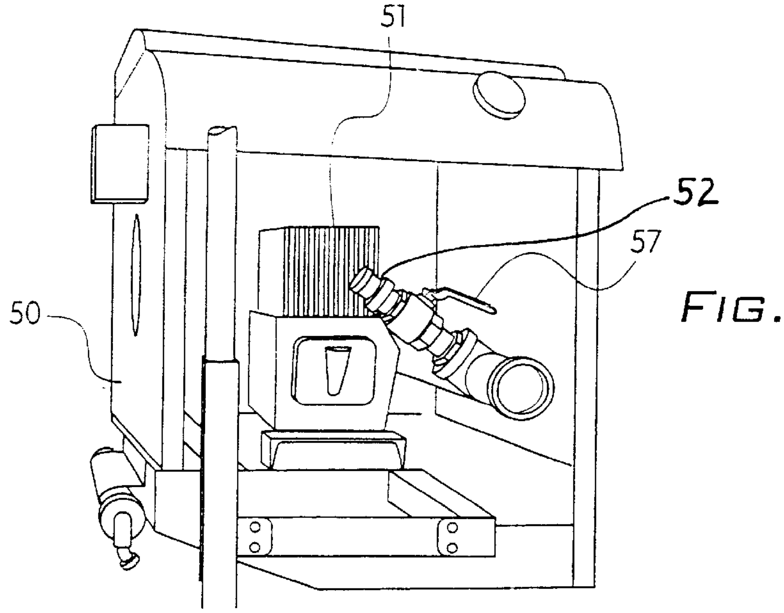
FIG. 7 shows a perspective view of the pump for the product.
Figure 10:
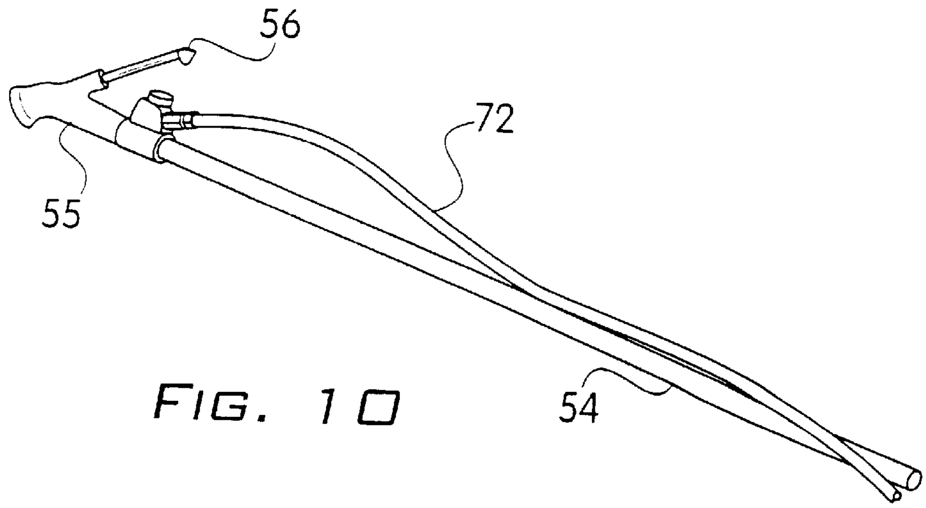
FIG. 10 shows a side view of the spray nozzle.

As shown in FIG. 7, pump 50 comprises a motor 51 and a nozzle connection 52 for connecting via hose 54 to a nozzle 55, shown in FIG. 10. Motor 51 is preferably a 30 horsepower motor. Nozzle 55 has an automatic remote shut-off valve 56, in which the user can immediately stop the pump in case of an emergency, and possibly prevent any hose blow-outs, which are common if the nozzle becomes clogged. Pump 50 can also be directly shut off at the pump as well at control valve 57.

Figure 8:
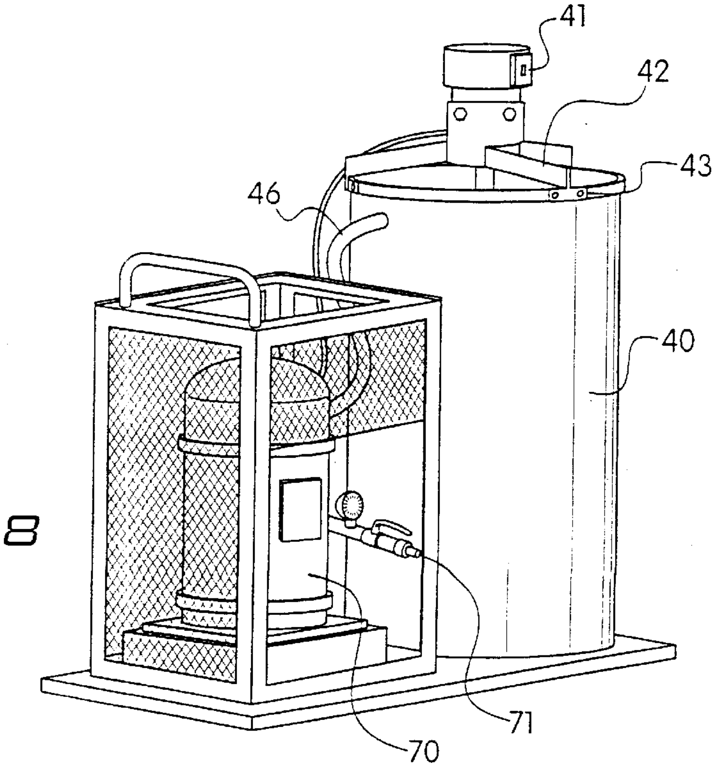
FIG. 8 shows a perspective view of the accelerator mixing vat and pump.
Figure 9:
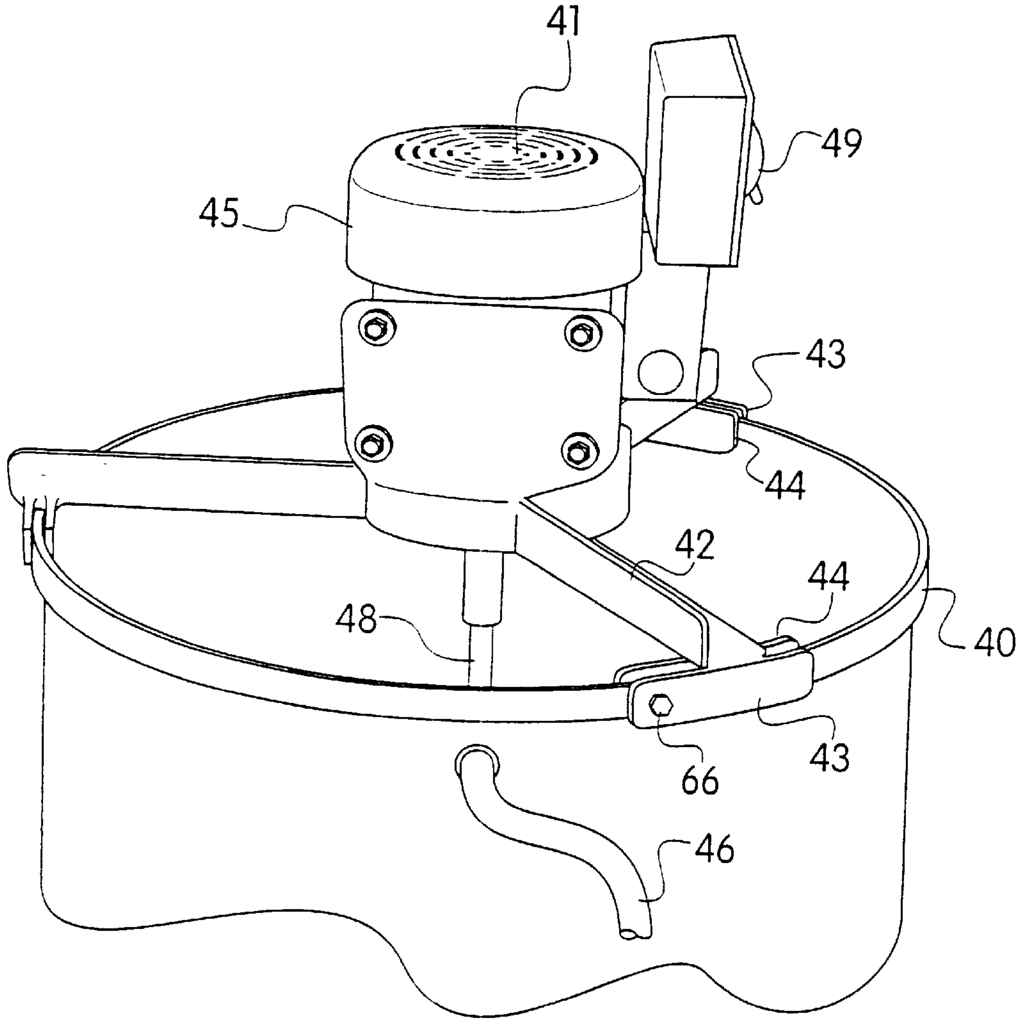
FIG. 9 shows an enlarged view of the accelerator mixing bracket.

As the product is sprayed out of nozzle 55, it is mixed with an accelerator that is pumped from accelerator vat 40, shown in detail in FIGS. 8 and 9. Accelerator vat 40 is connected with a rotating mixer 41 for mixing the dry accelerator with water. Mixer 41 is connected to a mixing bracket 42 for clamping mixer 41 to accelerator vat 40. As shown in FIG. 9, mixing bracket 42 has three prongs, each having clamps 43 and 44 at the end. Clamps 43 and 44 clamp the edge of mixing vat 40 and are held together by bolt 66 to hold mixer 41 securely to mixing vat 40. Mixer 41 also has a control box 49 for controlling the motor 45 of mixer 41, and a rotating shaft 48 extending down into vat 40 for mixing the accelerator. The mixed accelerator is then pumped out of mixing vat 40 via hose 46, and pumped to nozzle 55 through outlet 71 of pump 70 and through hose 72, shown in FIG. 10. The accelerator thus mixes with the product immediately before the mixture is sprayed onto the construction site.

Figure 11:
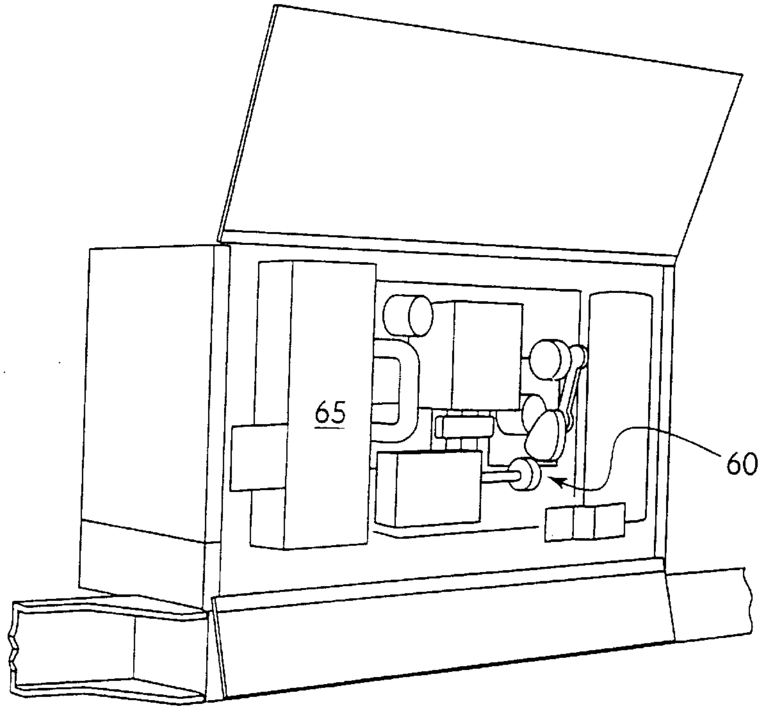
FIG. 11 shows a side perspective view of the generator.

The entire assembly is powered by a generator 60, which is shown in FIG. 11 and mounted on work platform 21. Generator 60 is a commercially available generator, such as a 40 kW 220V 3 phase John Deere generator. As shown schematically in FIG. 12, a fuel tank 61 is connected to generator 60 for providing fuel during operation.

Figure 12:
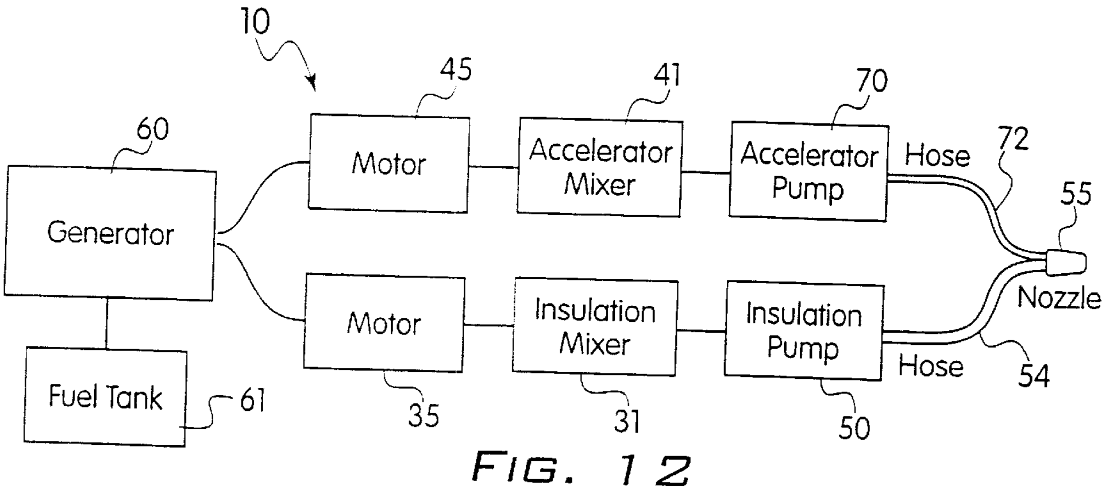
FIG. 12 shows a block diagram of the components of the apparatus according to the invention.

The connection between the various elements of the apparatus is shown in FIG. 12. Generator 60 powers the motors 35 and 45 of the mixers 31 and 41, respectively, which then pump the product and accelerator from pumps 50 and 70 through hoses 54 and 72 through nozzle 55 and onto the substrate.

Several unique safety features can also be added to the apparatus. For example, the apparatus could be fitted with non-skid surfaces, ground faults and grounding rods. Many OSHA related features could be added as well, such as guards. The apparatus also comes with labeled operational guides, material data safety sheets and Hazcom manuals to ensure the safe operation of the apparatus.

The present invention is an improvement over the prior art spraying systems because it contains all of the elements needed for a spraying job on one mobile rig, so that it is completely self-contained and portable. The only external element required is a source of water for mixing the product and accelerator.

Accordingly, while only a single embodiment of the present invention has been shown and described, it is obvious that many changes and modifications may be made thereunto without departing from the spirit and scope of the invention.

What is claimed is:

1. A mobile cementious fireproofing and specialty coating apparatus comprising:

a trailer having wheels and adapted to be attached to a truck;

a generator mounted on the trailer;

a fuel tank connected to the generator and mounted on the trailer, for powering the generator;

a work platform mounted to the trailer;

a first mixer for mixing dry product with water and being mounted on the work platform, said first mixer comprising a vat, a first rotatable mixing tool within the vat, and a first motor connected to said first mixing tool for rotating the first mixing tool, said first motor being connected to said generator;

a first pump connected to the generator and being mounted on the trailer adjacent the first mixer;

a first hose having two ends, one end connected to the first pump;

a nozzle connected to the other end of the first hose for spraying product from the first pump;

a second mixer for mixing accelerator with water and being mounted on the work platform, said second mixer comprising a mixing tank, a second rotatable mixing tool disposed within the mixing tank and a second motor connected to the second mixing tool and the generator;

a second pump connected to the generator for pumping the accelerator;

a second hose having two ends, said second hose being connected at one end to the second pump and at another end to the nozzle to mix the accelerator with the product;

a control box connected to the second pump for turning the second pump off and on;

a tool box mounted to the work platform; and scaffolding mounted to the trailer.

2. The apparatus according to claim 1, further comprising a remote switch located on the nozzle for turning the first pump off and on from the nozzle.

3. The apparatus according to claim 1, wherein the second mixer further comprises a bracket mounted around the top edge of the mixing tank and connected to the second mixing tool, said bracket having three prongs extending out from a central core, each prong being attached to the top edge of the mixing tank via a clamp.

4. The apparatus according to claim 1, wherein the mixing vat is pivotally mounted to the work platform and has a top opening such that the product is transported from the mixing vat to the first pump by tipping the mixing vat until the product pours from the mixing vat into the first pump.

5. The apparatus according to claim 1, further comprising at least one storage unit mounted to the trailer, said storage unit sized to contain scaffolding parts.

6. The apparatus according to claim 1, wherein the fuel tank holds 180 gallons of fuel.

7. The apparatus according to claim 1, wherein the generator generates at least 40 Kw of power.

8. The apparatus according to claim 1, wherein the first pump has at least 30 horsepower.

9. The apparatus according to claim 1, wherein the first hose is at least 300 feet long.

10. The apparatus according to claim 9, wherein the first hose has a diameter of about 2 inches near the first pump and wherein the diameter of the first hose decreases along its length to about 1 inch near the nozzle.

11. The apparatus according to claim 1, wherein the scaffolding and work platform are made of galvanized steel.

* * * * *